Dec. 18, 1951  A. M. WARRICK  2,578,868
CURTAIN STRETCHER
Filed May 25, 1949  3 Sheets-Sheet 1
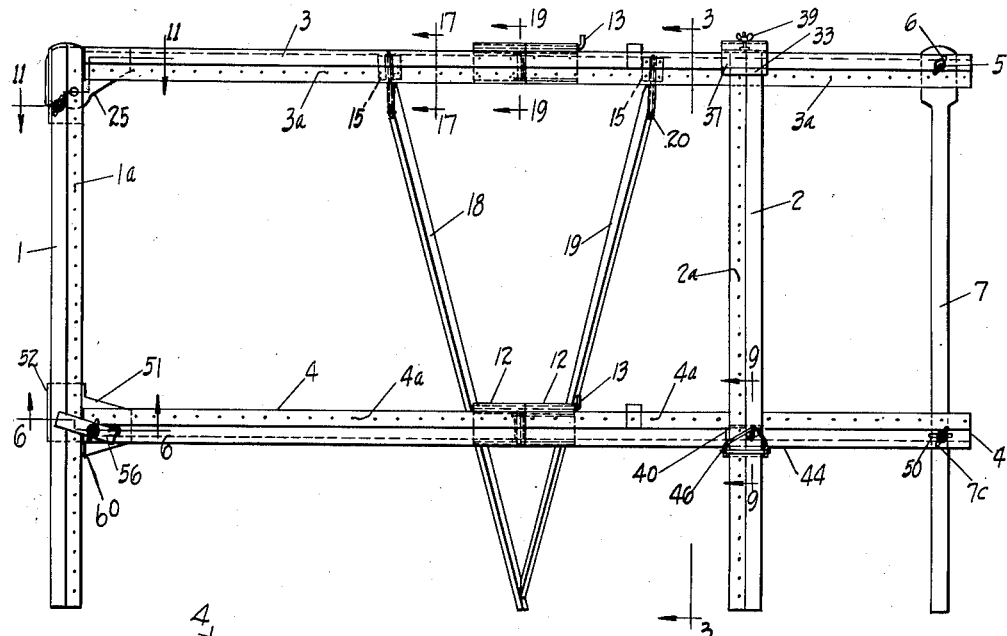
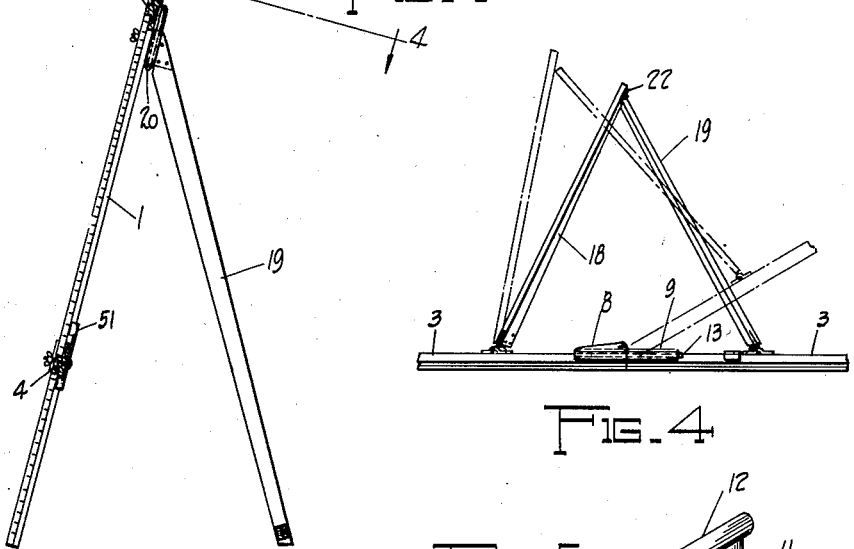
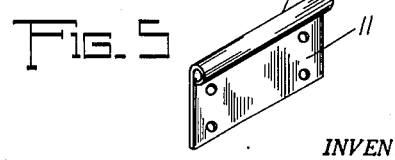
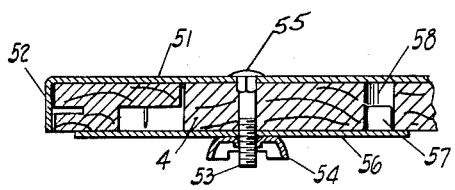
INVENTOR.
Arthur M. Warrick
BY Robb & Robb
Attorneys Dec. 18, 1951

A. M. WARRICK 2,578,868

CURTAIN STRETCHER

Filed May 25, 1949

INVENTOR.
Arthur M. Warrick
BY Robb & Robb
Attorneys

Dec. 18, 1951　　　　A. M. WARRICK　　　　2,578,868
CURTAIN STRETCHER
Filed May 25, 1949　　　　　　　　　　　　　　3 Sheets-Sheet 3
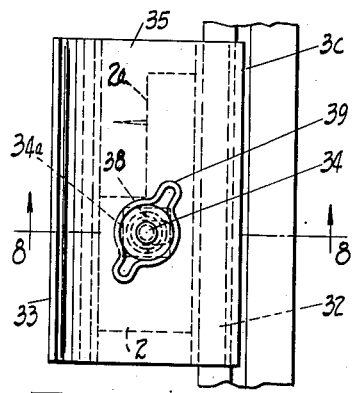
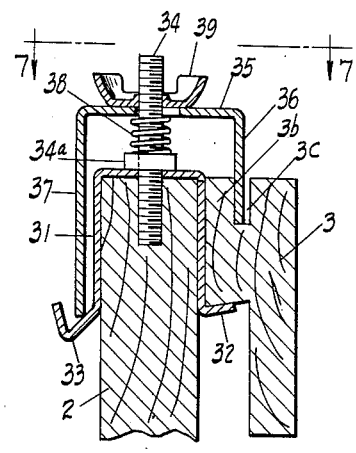
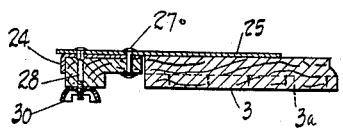
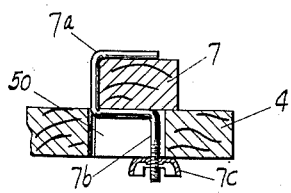
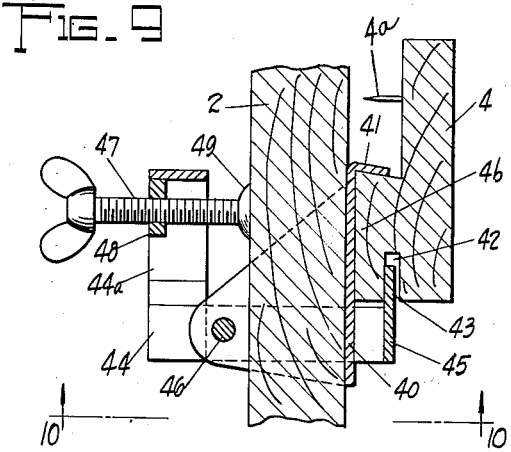
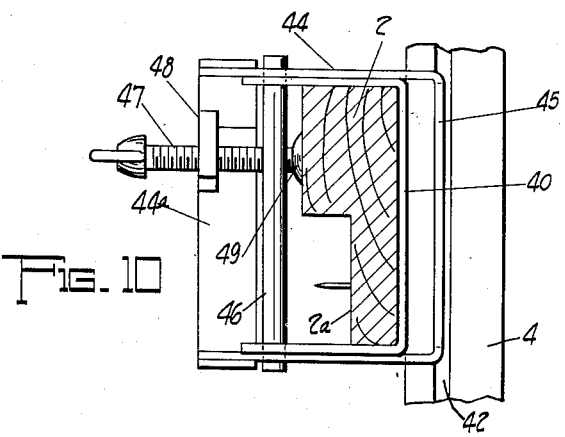
INVENTOR.
Arthur M. Warrick
BY Robb & Robb
Attorneys Patented Dec. 18, 1951

2,578,868

UNITED STATES PATENT OFFICE 2,578,868

CURTAIN STRETCHER

Arthur M. Warrick, Cleveland, Ohio

Application May 25, 1949, Serial No. 95,315

6 Claims. (Cl. 45—24)

This application is a continuation in part of my application for United States Letters Patent, Serial No. 5011, filed January 29, 1948, now abandoned.

My present invention pertains to the art of curtain stretchers and embodies certain novel improvements in the type of these stretchers which employ a stretcher frame comprising upper and lower bars and side bars which are relatively adjustable for handling stretching of curtains of different sizes.

A primary object of my invention lies in the provision of a curtain stretcher of the class set forth, of relatively simplified construction, which may be folded into a compact knock-down condition, and which may be readily set up for use, special provisions being made so that when the unit is placed in use certain of the parts and particularly the lower stretcher bar and one of the side stretcher bars will always assume and maintain a position in squared relation to the normally stationary side stretcher bar and the normally stationary upper stretcher bar.

My invention includes in its construction an improved upper bar mounting means between the upper stretcher bar and the relatively stationary side stretcher bar, which mounting means, when the stretcher unit is set up for use, will compel the accurate squaring of the upper stretcher bar in relation to the relatively stationary side stretcher bar, when the parts are fixed in their adjustment for such use.

Other provisions of improvement that I have specially designed for the curtain stretcher construction of my invention involve the mounting means of the lower horizontal stretcher bar upon the stationary side or vertical stretcher bar, such mounting means being peculiar in that it enables the easy raising and lowering of the lower stretcher bar with sliding action in relation to stationary and adjustable side stretcher bars, and when the manipulating force for the adjustment is released, said lower stretcher bar will automatically assume a position in which it will be maintained in square relation or at right angles to the side stretcher bars, whereupon, by the manipulation of suitable fastenings, the several bars may be tightened up in clamped relation.

Still another feature of improvement, specifically speaking, lies in the mounting of the adjustable side stretcher bar so that when it is moved for adjustment purposes either to the left or to the right, dependent upon the length of the curtain to be stretched, said movable stretcher bar will always be maintained in true perpendicular relation to the horizontal upper and lower stretcher bars.

Another improvement which I have made in my construction lies in the provision of a single folding prop carried by the central portion of the upper stretcher bar and so connected with the latter that it may be removed entirely for knocking down the stretcher assembly, but, when inoperatively positioned, it will be received or nested between the folding section of the upper and lower stretcher bars, and thus out of the way. The provision of the single rearwardly extending prop previously referred to is further advantageous in that it works in conjunction with the stationary vertical or side stretcher bar, and a foldable leg member, to provide a three-point support for the entire stretcher assembly when in use, thus ensuring that the stretcher may be supported on uneven floors, or the like, without wobbling, in the handling of the curtains to be stretched in applying the latter to the stretcher and removing the same therefrom.

Additional to the foregoing, the curtain stretcher of my present improvement is particularly advantageous in that by reason of the special construction employed it may be packed in semi-assembled condition, and the construction simplified so as to render it susceptible of quick and easy assemblage of the parts ready for use. Also, my present improved stretcher construction, in view of the method of clamping or connecting certain of the various parts of the frame and associated members, is rendered very easily adjustable, as well as easy to partially fold so that it may be carried any where needed, and may be very quickly taken down whenever desired to be placed out of use. The adjustable stretcher bar or upright provided in my construction is mounted so that it may be completely moved longitudinally along the upper and lower frame bars of the stretcher construction, and it is not necessary to remove this adjustable stretcher bar from the frame once it is mounted in place. My new clamping means for holding in position the lower horizontal bar of the stretcher frame has been simplified so that the raising and lowering of this bar to adjust the same for the particular curtain to be stretched is adapted to be very easily performed, and indeed can be done by the use of one hand in the operation of setting up the stretcher properly for adjustment for use in connection with the particular curtains to be stretched.

A full understanding of my present invention, including the improvements particularly referred to above, will be had upon reference to the detail description hereinafter provided, in conjunction with the accompanying drawings, and in the latter:

Figure 1 is a front elevation of a curtain stretcher embodying the essential features of my invention as when set up and in use.

Figure 3 is a vertical sectional view taken about on the line 3—3 of Figure 1, looking in the direction of the arrows.

Figure 4 is a top plan view of the stretcher in the condition in which it is generally shown in Figure 3, looking down thereon from the line 4—4 of Figure 3, dotted lines showing the action of the main frame bars and the prop in the commencement of the folding operation to bring the stretcher in the condition in which it is shown in Figure 2 of the drawing.

Figure 5 is a detail perspective view of one of the lock sleeve plates, a pair of which is located at the hingedly connected inner sections of the upper and lower stretcher bars of the curtain stretcher frame.

Figure 6 is a horizontal sectional view taken about on the line 6—6 of Figure 1, looking in the direction of the arrows.

Figure 7 is a fragmentary plan view looking down upon the upper horizontal bar of the stretcher frame and illustrating more clearly the clamping device connecting the adjustable upright or stretcher bar to the upper and lower horizontal bars of the stretcher frame.

Figure 8 is a vertical sectional view taken about on the line 8—8 of Figure 7.

Figure 9 is a vertical sectional view of the lower clamping device between the adjustable upright or stretcher bar and the lower horizontal bar of the stretcher frame, the section being taken about on the line 9—9 of Figure 1, looking in the direction of the arrows.

Figure 10 is a view of the means shown in Figure 9, said view being a sectional view taken about on the line 10—10 of Figure 9.

Figure 11 is a sectional view taken about on the line 11—11 of Figure 1, the upper horizontal stretcher bar being broken away.

Figure 12 is a fragmentary view in elevation looking toward the left hand upper corner portion of the stretcher as seen in Figure 1, from the rear side, bringing out the formation of what I call the squaring plate and its mounting upon the stationary upper stretcher bar, in relation to the stationary side stretcher bar or upright, said plate ensuring the positioning of these parts in a true right angular relation when the unit is set up for use, the stationary upright or vertical stretcher bar being shown in dotted lines in its operative position.

Figure 13 is a fragmentary sectional view showing a detail feature of a connecting hook structure between the lower horizontal bar of the stretcher frame and the end supporting leg of said frame.

Figure 2:
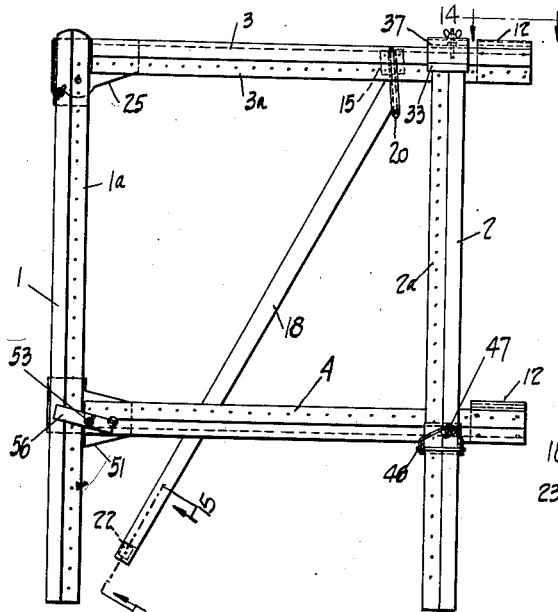
Figure 2 is a view in elevation showing the stretcher frame as when folded into what may be characterized as a half knocked-down condition ready to be stored away for future use.
Figure 14:
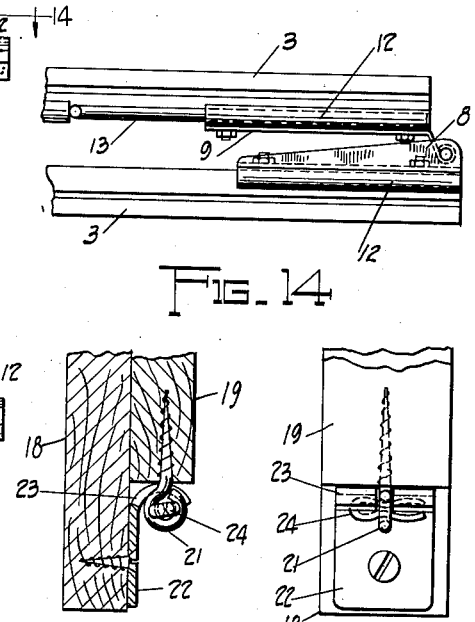

Figure 14 is a fragmentary view looking down upon the hinge connection between the sections of the upper horizontal bar of the stretcher frame, the view being taken about on the line 14—14 of Figure 2, looking in a downward direction.

Figures 15, 16:
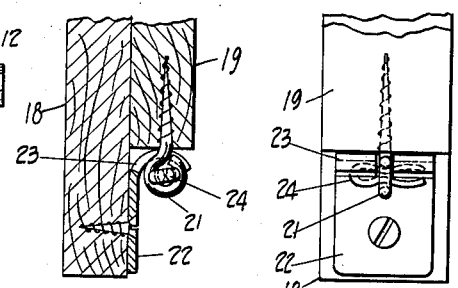

Figure 15 is a fragmentary sectional view taken on the line 15—15 of Figure 2, looking in the direction of the arrows, and bringing out more clearly the disposition of the pivotal and swivel connection between the members of the prop and the disposition of these members when the stretcher is in the folded condition of Figure 2.

Figure 16 is a view of the parts shown in Figure 15, looking at the same at a right angle to the sectional view depicted by Figure 15 and illustrating the parts in elevation.

Figure 17:
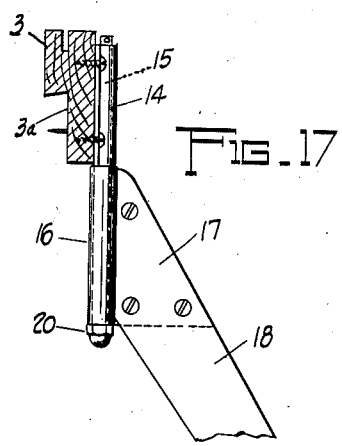

Figure 17 is a sectional view taken about on the line 17—17 of Figure 1, looking in the direction of the arrows, bringing out more clearly the connection of each of the folding members of the prop with one section of the upper horizontal bar to which said prop is attached.

Figure 18:
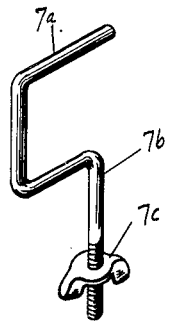

Figure 18 is a detail view of the hook connector shown in Figure 13.

Figure 19:
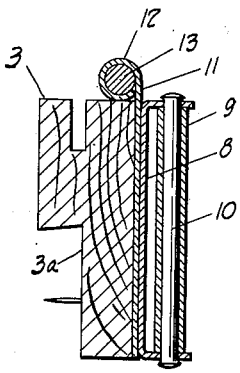

Figure 19 is a sectional view taken through the lock sleeve connection used for each of the upper and horizontal bars of the stretcher frame, the section being taken about on the line 19—19 of Figure 1 and being applicable to the corresponding parts that are shown at the point of connection of the sections of the lower horizontal bar of the frame.

Figure 20:
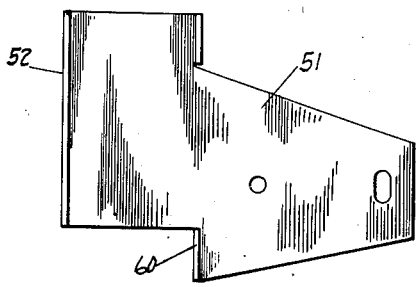

Figure 20 is a view in elevation of the attachment plate intermediate the stationary upright or stretcher bar and the left end of the lower horizontal stretcher bar.

Since Figure 1 illustrates a complete view of the stretcher unit embodying my invention, reference will first be made thereto. It will be noted from this figure that I employ for the stretcher frame the left or relatively stationary stretcher bar 1 equipped with the usual longitudinally disposed line of curtain engaging pins 1a disposed in a vertical direction, of course, the relatively movable upright or side stretcher bar 2 similarly equipped with a series of pins 2a in a vertical line thereon, the two bars 1 and 2 being intended to maintain parallelism with each other when the curtain stretcher is set up. There is used also the upper horizontal relatively stationary stretcher bar 3 and the relatively movable and vertically adjustable horizontal lower stretcher bar 4, these bars having, respectively, the usual curtain engaging pins 3a and 4a. On the end of the upper stretcher bar 3 remote from the bar 1, I mount, by means of a fastening thumb nut type of screw 5, having the wing nut 6, a vertical leg 7 which is of slightly greater length than the length of the adjustable vertical stretcher bar 2, said leg being foldable toward a position of alignment with the bar 3 when not in use, or being removable from the bars 3 and 4 if desired when the curtain stretcher frame is knocked down or partially collapsed. The leg 7 is connected by the hook 7a of a hook connector seen best in Figure 13, to the lower bar 4, the tang 7b of said hook connector being screw threaded to receive a wing nut 7c. The hook connector just described affords a very simple and easy means enabling the complete detachment of the leg 7 along with the use of the parts 5 and 6 previously referred to, so that the leg 7 may be entirely dismounted from the stretcher frame when it is knocked down or when it is in packed condition, but readily to be assembled therewith in setting up the frame for use.

The two bars 3 and 4 are made in sections of about equal length which are hinged together at their adjacent ends by means of suitable hinges comprising the parts 8 and 9 seen best in Figures 14 and 19 of the drawings, said hinge parts being connected together by a pintle member 10. By means of the hinging parts just referred to, the bars 3 and 4 may be folded from the expanded or operative positions of Figure 1 to the folded condition which is illustrated in Figure 2, and also partially illustrated in Figure 14. Intermediate each of the hinge plates 8 and 9 and its respective section of the bar 3 and/or 4 to which it is attached, is located a sleeve plate which is illustrated in Figure 5 of the drawings, and designated 11. The sleeve plate 11 has a sleeve 12 thereon, and when the sections of each of the bars 3 and 4 are in alignment, the sleeves 12 of the respective section are correspondingly aligned, so that a lock bolt 13 having a laterally turned fingerpiece may be moved from a position in which it is wholly supported by one of the sleeves 12, to enter the other of the sleeves 12 adjacent thereto and maintain the sections of the bars 3 and 4 in this manner in aligned relation. Pulling outwardly on the fingerpieces of the bolts 13 enables disengagement of the bolts from the sleeves remote from the fingerpieces so as to facilitate the folding of the sections of each of the bars 3 and 4 upon one another after the manner illustrated in Figure 2 as when the curtain stretcher is out of use.

As seen primarily in Figures 1, 2, 3, and 4, I employ in conjunction with my curtain stretcher unit a special type of prop by which the curtain stretcher is supported in its upright position, as when in use, and the primary feature of this prop construction lies in that it provides, in conjunction with the relatively stationary stretcher bar 1, and the legs 7, a third supporting member in the form of said prop. The parts 1 and 7 are substantially the same length and will contact with the surface on which the curtain stretcher is supported, at the lower ends of said parts 1 and 7, while the prop which is used, and just referred to, is located about midway of the ends of the bars 3 and 4 and has a single point contact with the supporting surface so that even if the supporting surface is uneven, nevertheless, the curtain stretcher will rest upon three members and will not tend to rock or tilt when set up for use.

Describing the prop which I employ, specifically, reference is made to Figures 1, 3, and 17 primarily. As seen in Figure 17, and in Figure 1, there is secured to each of the sections of the upper stretcher bar 3, outwardly of the hinge connection between the sections, a sleeve 14 in which is mounted a pintle rod 15 which depends some distance below said sleeve and below the under side of the bar 3. On the lower end portions of the rods 15 are mounted, by sleeve members 16 on plates 17, the upper ends of the two members 18 and 19 which form the single base point prop previously referred to. The sleeve 16 attached to the members 18 and 19 are prevented from displacement from the pintle rods 15 by nuts 20 screwed on the lower ends of said pintle rods. Obviously, the members 18 and 19 of the prop, as seen in Figure 1, are brought together at their lower ends, so that, generally, as viewed from the front, the prop comprises a V shaped structure. With this in mind I attach the lower ends of the members 18 and 19 by means of a pivoting and swivelling connecting device as seen in Figures 15 and 16, said device consisting of an eye-screw 21 which is screwed into the lower end of the member 19, and a plate 22 attached to the adjacent side of the member 18, which plate has a curved slotted portion 23, through which the shank of the eye screw 21 extends, with the loop of said screw received in the curved portion of the plate, designated 23, displacement of the parts 21 and 23 from connection being prevented by employing a cross cotter-pin 24 to maintain said connection, but permit of pivoting as well as swivelling action intermediate the head or loop or eye of the screw 21, and the plate portion 23. This kind of a connection is necessary in order to permit of the required movement of the members 18 and 19 of the prop incident to the folding together of these members into side by side positions when they are arranged as shown in the knocked down condition of the curtain stretcher as seen in Figure 2, as well as providing for the separating movement of these parts when they are set up in the condition of Figure 1.

It is notable that the mounting means between the upright member or stretcher bar 1 and the upper stretcher bar 3 is seen best in Figures 1, 11, and 12. It comprises a squaring plate 25 which is attached by suitable fastenings to the left hand end of the bar 3 and is formed at its lower edge with an arcuately formed edge portion 26, the arc of which is generated around a pivot fastening 27 that connects the plate 25 and thereby the upper bar 3 pivotally with the upper portion of the side stretcher bar 1. Thus, when the stretcher bar 1 is swung downwardly from a position in which it may be collapsed against the lower edge portion of the bar 3, to an operative position relatively to the bar 3, a fastening bolt 28 which passes through the upper portion of the bar 1, the plate 25, and an intermediate flange plate 29, moves with the bar 1, a suitable wing nut 30 being provided for the bolt 28. With the above connection in mind, it will be seen that when the side bar 1 is swung downwardly in the manner above mentioned, the bolt 28 will ride along the curved edge 26 of the squaring plate 25 until the bolt strikes an abutment extension 25a of the plate 25. At this time the bar 1 will be in a position at an exact right angle to the bar 3. Under these conditions, the user of my curtain stretcher unit, when adjusting the parts 1 and 3 just above mentioned, will be compelled to properly square the bar 1 in relation to the bar 3 and at a right angular position relatively thereto.

As seen upon reference to Figures 1, 7 and 8, I employ a special novel form of quick clamping means intermediate the upper end of the adjustable vertical upright or stretcher bar 2, and the upper horizontal stretcher bar 3. A primary purpose of the clamping means is to avoid the necessity for slotting the member 3, an expedient which has been commonly resorted to heretofore in stretcher devices of the type of my invention. With the above objective in mind, I have provided on the front face of the bar 3, at its upper half section at least, a longitudinal rib or enlargement designated 3b. The under side of the said rib or enlargement 3b is slightly undercut as seen in Figure 8. At its upper face the bar 3 is formed with a longitudinal kerf 3c. Now straddling the upper end portion of the bar 2 is a first stationary clamping member 31. This clamping member is made out of strap metal and is of U-form with the depending sides overlapping the upper portions of the sides of the bar 2. On the rear leg of the clamping member 31, at the lower end thereof, is an outwardly projecting clamping flange 32. On the outer leg of the clamping member 31 at its lower end is an outwardly projecting camming member 33 of somewhat V-form integral with the said leg, for a purpose shortly to be described. The member 31 is attached rigidly to the member 2 which is the adjustable upright or stretcher bar, by means of a screw bolt designated 34 entering the upper portion of the member 2 at the upper end of the latter.

A shoulder on the bolt 34, designated 34a, impinges the upper cross portion of the member 31. The upper end of the bolt 34 is also of screw threaded form, and mounted loosely thereon is a secondary clamping member 35 of U-form, one of the legs of which is shorter than the other. The shorter leg 36, at its lower end, enters the kerf 3c of the upper stretcher bar 3. The longer leg 37 of the member 35, at its lower end, is adapted to ride upon the upper surface of the V-shaped cam member 33 of the clamping member 31. A spring of coil type, 38, is interposed between the two members 31 and 35, and tends to raise the member 35 slightly relatively to the member 31. A wing nut 39 is screwed onto the upper threaded shank of the screw 34 and is adapted to bear downwardly and move downwardly the member 35 relatively to the clamping member 31. The foregoing structure provides an advantageous form of clamping means intermediate the parts 2 and 3, as it will be seen that upon screwing the member 39 downwardly on the screw 34, the leg 37 of the member 35 will tend to ride forwardly on the cam 33, and, through the leg 36, pull the parts 2 and 3 together in tight impingement at the same time that the member 3 is clamped by the projection or flange 32 and the part 3c of the member 35. The above type of clamp also facilitates quick removal of the connection between the upper end of the member 2 and the horizontal bar 3 whenever such is desired, as for knocking down the curtain stretcher in a disassembly operation.

I next describe the adjustable and detachable clamping connection between the lower portion of the upright or adjustable stretcher bar 2 and the lower horizontal stretcher bar 4. The construction of this clamping means is best seen in Figures 1, 9, and 10, wherein it will be observed that the bar 4 is provided at its lower front side portion with a rib or extension longitudinally thereof designated 4b. Carried on the upright or bar 2, which is of course adjustable longitudinally of the bars 3 and 4, are the clamping means comprising a device made up of a U-shaped clamping member 40 which straddles the bar 2 extending forwardly at opposite sides of said bar, said clamping member 40 having a rearwardly extending flange 41 at its upper end to overlie the rib or extension 4b of the bar 4. In the lower edge of the bar 4 is provided a kerf 42, in which kerf is received the upwardly projecting flange 43 of a lever clamping member generally designated at 44 and comprising a vertical arm and a horizontal arm, the latter carrying the flange 43. The lever 44 is of U-form also, and a cross bar 45 of the lever has the flange 43 integral therewith, and the sides of said lever member are disposed outwardly of the sides of the clamping member 40. A pivot shaft 46 passes through the forward end portions of the sides of the member 40 and through a forward end portion of the lever 44 at the horizontal portion thereof. The shaft 46 pivotally connects the two members 40 and 44 so that the member 44 with lever-like action can rock relatively to the clamping member 40, especially to raise the flange member 43 in the kerf 42 of the bar 4. The vertical arm 44a of the lever 44 carries a clamping screw 47 having a wing nut turning thumb piece at its outer end and passing through a threaded opening in a lug 48 on the upper portion 44a of the lever 44. The inner end or rear end of the screw 47 is adapted, by a head 49, to impinge against the front side of the vertical upright 2. Turning of the screw 47 to impinge the member 2, as seen in Figure 9, will tend to rock the outer end 44a of the lever downwardly and raise the flange 43 into clamping engagement in the kerf 42 of the bar 4. At the same time the downward torque on the member 40 at the shaft 46 incident to said rocking action of the lever 44 will tend to move the flange 41 on the clamping member 40 downward into engagement with the upper side of the rib 4b of the bar 4, so that the clamping action of the clamping device above set forth will be quite apparent from the foregoing description.

The bar 4, at the point where it is connected to the leg 7, is formed with an elongated slot 50 through which the hook 7a of the connector member 7b may be readily passed and quickly engaged with the leg 7 to move the latter into the said hook.

The clamping means between the left hand end of the lower stretcher bar 4 and the vertical relatively stationary stretcher bar 1 remains to be described. As seen in Figures 1, 6 and 20, this clamping means comprises an attachment plate 51 which is equipped with a lateral flange 52 at its outer end adapted to overlie the outer side of the bar 1. The attachment plate is clamped in secure connection with the horizontal bar 4 by means of a screw bolt 53 which has a wing nut 54 to screw on its threaded end, and a head 55 on its opposite end. The attachment plate 51 lies on the rear side of the vertical bar 1 and the screw bolt 53 passes through the middle portion of a clamping plate 56 on the front side of the bar 4, the outer end of the clamping plate 56 being adapted to engage the front surface of the bar 1 and the body of the clamping plate lying against the front adjacent surface of the bar 4. On the inner end of the clamping plate 56 is a lug 57 which is adapted to lie in a recess 58 provided in the front base of the bar 4. The plate 51 has a lateral stop lug 60 below the bar 4 to limit the down movement of the bar 4 as its outer left end impinges the inner side of the bar 1, to hold the bar 4 at a right angle to the bar 1.

Since the left end portion of the bar 4 lies in contact with the right inner side of the bar 1 when the clamping means 53, 56 is secured tightly in place with the parts 1 and 4 juxtaposed in the manner stated, the bar 4 will be maintained in a position extending at an accurate right angle to the bar 1, or, in other words, substantially squared in relation thereto by its rectilinear disposition, in a manner similar to the manner in which the bar 3 is held at right angles to the bar 1 as shown in the upper left hand corner of the illustration in Figure 1.

With the construction of the stretcher unit as described in the foregoing description, it will be evident that with the parts set up as in Figure 1, the curtain stretcher is supported at its left end upon the upright or stationary stretcher bar 1, at its right end by the leg 7, and intermediate its ends by means of the prop comprising the members 18 and 19. The bars 3 and 4 are maintained in proper right angular positions relative to the bar 1 by means of the upper squaring device and clamping device at the upper left hand corner of the stretcher unit and the clamping device at the point of connection of the bar 4 and said bar 1. The leg 7 is removably mounted in position by the connection 56 to the bar 3 and lower connections 7a, 7b to the bar 4. Adjustment of the upright or adjustable stretcher bar 2 to any point in the length of the bars 3 and 4 is obtainable by release of the clamping devices intermediate the upper end of the bar 2 and the bar 3 and intermediate the lower portion of the bar 2 and the bar 4, these clamping devices being shown most clearly in Figures 7 and 10 of the drawings. The various clamping devices employed by me may be very quickly released, if it is desired to disassemble the various connections between the upper and lower bars 3 and 4, respectively, and the outer and inner bars 1 and 2, respectively.

In the folding operation of the unit to cause the same to assume the condition shown in Figure 2, it will be apparent that the bolts 13 will be pulled out so as to eliminate the interlock between the hinged inner ends of the sections of the bars 3 and 4, whereupon the right hand sections of the bars 3 and 4 may be folded toward the left hand section, or vice versa, and in this action the members 18 and 19 will be adapted to move together into side by side positions in substantial contact as soon as the folded condition of Figure 2 is achieved. Under these conditions the lower portions of the members 18 and 19 will lie between the sections of the bar 4 and will be held in such positions by the collapsed arrangement of the stretcher unit.

The clamping means 51, 56, 53, and 54 permits quick vertical adjustment of the bar 4, when loosened, along with loosening of screw 47, an adjustment that may be performed by one hand at the middle of the bar 4, raising the latter. Loosening of screw connection 34 by nut 39, and screw 47 enables quick adjustment of the bar 2 toward or from the bar 1.

Having thus described my invention, what I claim as new and desire to secure by Letters Patent of the United States, is:

1. In a curtain stretcher, in combination, a frame comprising relatively movable upper and lower stretcher bars and relatively movable side stretcher bars, connections between said bars, the upper and lower bars each comprising sections hingedly connected intermediate their ends so they may fold rearwardly together by movement of corresponding end sections toward the other corresponding end sections, and a prop comprising members pivotally connected at the upper ends each to a separate one of the sections of the upper bar, said prop members being pivotally connected at their lower ends and extending rearwardly from the frame so as to nest between the respective sections of the upper and lower bars when the latter are folded together.

2. A stretcher as claimed in claim 1, combined with means to hold such sections alined, comprising a slide member on a section of one of the upper and lower bars, and a keeper on the other of the sections of such bar engageable with the said slide member, the members of the prop being connected to the upper bar at points spaced outwardly of the hinge connection of the sections thereof.

3. A stretcher as claimed in claim 1, in which the prop at its lower end has a single point for engagement with a supporting base, and in which one of the side stretcher bars forms a leg support at its lower end for one end of the frame, in which the other side stretcher bar is shorter than the last mentioned side stretcher bar, and adjustable toward and from the latter, and a leg member attached to the other end of the frame to engage a supporting surface and hold the shorter side stretcher bar up from said surface for free adjustment.

4. A stretcher as claimed in claim 1, in which one of the side stretcher bars forms a leg support at its lower end for one end of frame, in which the other side stretcher bar is shorter than the last mentioned side stretcher bar, and adjustable toward and from the latter, and a leg member pivotally secured to the upper stretcher bar at the other end of the frame to engage a supporting surface and hold the shorter side stretcher bar up from said surface for free adjustment, said leg being swingable to a position adjacent to the upper stretcher bar in collapsing the frame.

5. In a curtain stretcher, in combination, a stretcher frame comprising a relatively stationary vertical stretcher bar, a relatively movable vertical stretcher bar, upper and lower horizontal stretcher bars connected to the vertical stretcher bars and each composed of sections hinged intermediate their ends to fold one toward the other, and a prop comprising separate side members movably joined together at their lower ends and each pivotally attached at its upper end to an adjacent section of the upper stretcher bar.

6. A curtain stretcher as claimed in claim 5, in which the side members of the prop assume upwardly diverging positions when the sections of the upper stretcher bar are alined, and in which the lower ends of the prop side members are pivotally and swivelly connected at the lower ends, the lower end of the prop providing a single point of support when in use.

ARTHUR M. WARRICK.

REFERENCES CITED

The following references are of record in the file of this patent:

UNITED STATES PATENTS

| Number | Name | Date |
| --- | --- | --- |
| 863,329 | Stanfield | Aug. 13, 1907 |
| 993,519 | Guth | May 30, 1911 |
| 1,239,877 | Bush | Sept. 11, 1917 |
| 1,686,253 | Quiggle | Oct. 2, 1928 |
| 1,706,283 | Flink | Mar. 19, 1929 |
| 1,929,629 | Dougherty | Oct. 10, 1933 |
| 1,944,549 | Ellis | Jan. 23, 1934 |
| 2,217,004 | Carlson | Oct. 8, 1940 |
| 2,279,647 | Watling | Apr. 14, 1942 |
| 2,429,256 | Block | Oct. 21, 1947 |